No. 784,988. PATENTED MAR. 14, 1905.
C. W. DAKE.
PHOTOGRAPHIC EXPOSURE METER.
APPLICATION FILED MAY 16, 1904.
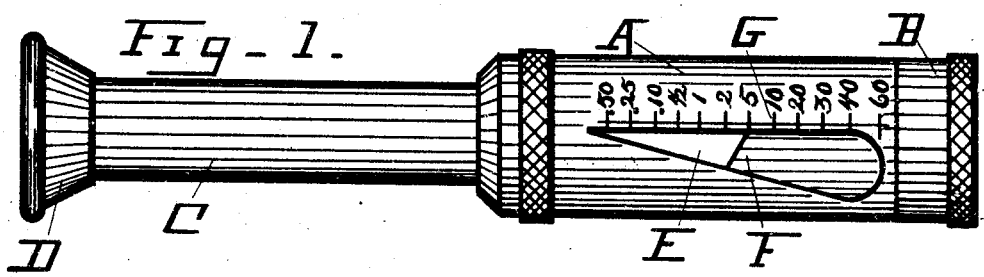
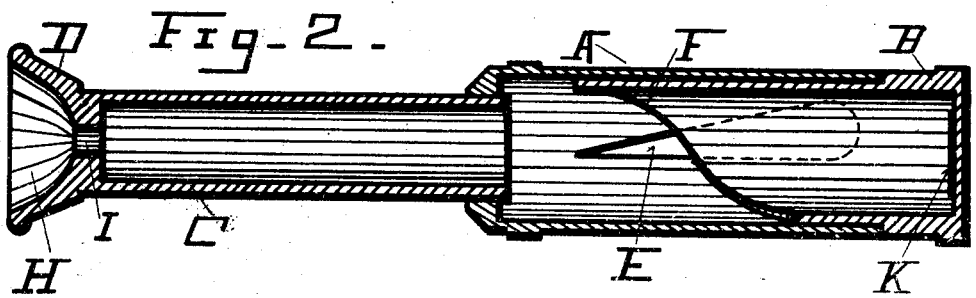
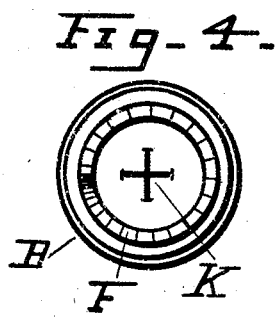
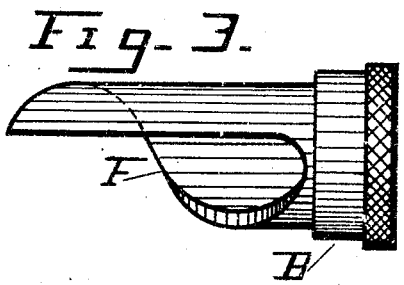
WITNESSES:
Mary S. Tooker
Charles M. Wilson
INVENTOR
Charles W. Dake
BY Edward Taggart
ATTORNEY.

No. 784,988.  
Patented March 14, 1905.

UNITED STATES PATENT OFFICE.

CHARLES W. DAKE, OF GRAND RAPIDS, MICHIGAN, ASSIGNOR OF ONE-HALF TO WILLIAM DONKER, OF GRAND RAPIDS, MICHIGAN.

PHOTOGRAPHIC EXPOSURE-METER.

SPECIFICATION forming part of Letters Patent No. 784,988, dated March 14, 1905.

Application filed May 16, 1904. Serial No. 208,269.

*To all whom it may concern:*

Be it known that I, CHARLES W. DAKE, a citizen of the United States, residing at Grand Rapids, in the county of Kent and State of Michigan, have invented new and useful Improvements in Photographic Exposure-Meters, of which the following is a specification.

This invention relates to a new and useful time exposure-meter for the purpose of determining the length of time a photograph-camera ought to be exposed in order to obtain the most perfect picture of the object to be photographed; and the invention consists generally of a closed chamber, preferably of tubular form provided with suitable openings or opening for the admission of light into such chamber, a visual figure in the chamber, an eye-opening for viewing the said figure, and suitable means for regulating the quantity of light which enters the said chamber.

The objects of my invention are, first, to produce a photographic time exposure-meter by means of which the operator can quickly determine the length of time he should expose his camera in order to produce the best results; second, to furnish a suitable meter, which notwithstanding the strength of the light will quickly and accurately determine and indicate the proper time for the camera exposure. These objects I accomplish by means of the mechanism illustrated in the accompanying drawings, in which—

Figure 1 shows a side elevation of the meter constructed in accordance with my invention, illustrating the light-opening partially closed. Fig. 2 is a longitudinal sectional view taken vertically with reference to Fig. 1. Fig. 3 shows my preferred form of the device used in adjusting the quantity of light which passes into the chamber, said form shown in Fig. 3 being adapted to fit into the tubular part of the chamber and to form an end piece therefor. Fig. 4 is an end view looking into the sleeve or cap illustrated in Fig. 3.

Similar letters refer to similar parts throughout the several views.

I prefer to form the chamber with an extension and also to form the chamber in tubular form, although the form and shape of the chamber may be varied and the extension may or may not be used.

In the drawings, A shows the outside shell of the chamber provided with one or more openings. In the form illustrated in the drawings a single opening is used, which is broader at one end and extends to an angle at the other. This is my preferred form.

B shows a cap having an internal projecting sleeve, said part B forming the bottom or closed end of the chamber when placed in position. This sleeve B, with the cap, may be turned as hereinafter described. The sleeve portion of B is provided with the wedge-shaped form F, as shown, and by turning the sleeve B the opening E in the shell A of the chamber may be closed or partially closed or may be turned, as required. It is by this means that I regulate the amount of light passing into the shell A for the purposes hereinafter described.

C is the extension part of the device, which in Figs. 1 and 2 is shown drawn out. This extension part may, however, be dispensed with, inasmuch as the same is used only as a matter of convenience in packing.

D shows the eyepiece, the eyepiece being cup-shaped, as shown by H, and provided with a small opening I.

K represents any suitable figure opposite the eyepiece, which in the example of my invention is placed in the cap B and is made in the shape of a cross. Any other form, however, may be used.

In order to determine the length of time the camera should be exposed in any given strength of light, I provide graduating-marks, which in the example of my invention shown in the drawings I have indicated by seconds and fractions of seconds up to sixty seconds, beginning with one-fiftieth of a second, more fully shown in Fig. 1. The sleeve having the wedge-shaped form F is so constructed that when it is turned the size of the opening will be indicated by the graduating-mark—that is, if the opening extends from the apex to the point marked one-tenth of a second it indicated that the exposure of the camera should be one-tenth of a second, or if at one second it indicates that the exposure of the camera should be one second. In order to determine the time of exposure the eye of the operator is placed at D, so as to bring the figure K in range with the eye. The cap or sleeve B is then turned, admitting light into the chamber until the figure K appears to the observer. The index will then show the length of time for the exposure. If the day is dark or the place is dark where the picture is to be taken, the opening E must be enlarged, sometimes even to the extent of one minute. The time, however, will vary according to the strength of light, and I have found by practical tests that when figure K appears to the eye, so as to be shown fairly in outline, the index will accurately measure the time for the camera exposure.

In the drawings I have shown the graduating index placed upon the shell A; but the same may be placed in any suitable position, and I do not wish to limit myself either to the location of the index figures or characters nor to the number of such characters used. Neither do I wish to limit myself to the particular form of chamber, and it will be evident that the form may be changed, as well as the shape of the opening which admits the light into the chamber, and that other suitable ways for admitting the light and regulating the amount of light received into the chamber may be used.

Having thus described my invention, what I claim to have invented, and desire to secure by Letters Patent of the United States, is—

1. As a new article of manufacture, a photographic exposure-meter involving a casing forming a chamber and provided with a graduated light-inlet, said casing further provided with an eye-opening, and a sleeve arranged in operative relation with respect to said casing having one end closed and further provided with an irregular-shaped inner end, said irregular-shaped inner end of said sleeve adapted to gradually close said light-inlet, said sleeve having the inner face of its closed end provided with a visual figure.

2. As a new article of manufacture, a photographic exposure-meter involving a closable chamber provided with a light-inlet, a visual figure within said chamber, a rotatable sleeve extending into said chamber for regulating the quantity of light admitted through said inlet, and an index for indicating the time an object should be exposed for the purpose of photographing.

3. As a new article of manufacture, a photographic exposure-meter involving a closable chamber provided with an irregular-shaped light-inlet, a visual figure within said chamber, a rotatable sleeve extending within said chamber and adapted to regulate the amount of light admitted to said chamber through said inlet, said sleeve having an irregular-shaped inner end, and an index for indicating the time an object should be exposed for the purpose of photographing.

4. As a new article of manufacture, a photographic exposure-meter involving a casing forming a chamber and provided with a graduated light-inlet, said casing further provided with an eye-opening, and a rotatable sleeve having one end closed and projecting in said casing for closing one end thereof and further provided with an irregular-shaped inner end, said irregular-shaped inner end adapted to close said light-inlet in a graduating manner, said sleeve having the inner face of its closed end provided with a visual figure.

5. As a new article of manufacture, a photographic exposure-meter, involving a closed chamber having an eye-opening and a graduated light-inlet, and a rotatable means extending in said chamber for regulating the quantity of light admitted through said inlet and provided with a visual figure adapted to be seen through said eye-opening.

6. As a new article of manufacture, a photographic exposure-meter, involving a closed chamber having an eye-opening and a graduated light-inlet, a rotatable means extending in said chamber for regulating the quantity of light admitted through said inlet and provided with a visual figure adapted to be seen through said eye-opening, and a time-register for indexing the time that a camera should be exposed, said index arranged in operative relation with respect to said light-inlet.

7. As a new article of manufacture, a photographic exposure-meter involving a casing forming a chamber and provided with a graduated light-inlet, said casing further provided with an eye-opening, a sleeve arranged in operative relation with respect to said casing having one end closed and further provided with an irregular-shaped inner end, said irregular-shaped inner end of said sleeve adapted to gradually close said light-inlet, and a visual figure arranged in operative relation with respect to said casing.

8. A photographic exposure-meter involving a hollow tubular casing open at one end and having its other end provided with an extension having an eye-opening, said casing forming a chamber and said casing provided with a graduated inlet for admitting light into the chamber, a rotatable regulating means extending in said chamber and adapted when operated to gradually close said inlet, thereby regulating the quantity of light admitted into said chamber, and a visual figure arranged in the chamber opposite said eye-opening.

9. A photographic exposure-meter involving a hollow tubular casing open at one end and having its other end provided with an extension having an eye-opening, said casing forming a chamber and said casing provided with a graduated inlet for admitting light into the chamber, a rotatable regulating means extending in said chamber and adapted when operated to gradually close said inlet, thereby regulating the quantity of light admitted into said chamber, and a visual figure carried by said regulating means and arranged opposite said eye-opening.

10. A photographic exposure-meter involving a casing forming a chamber, open at one end and having its other end provided with an extension having an eye-opening, a sleeve projecting in said chamber and having a closed outer end, thereby closing the open end of said casing, said sleeve having an irregular-shaped inner end, said inner end of said sleeve adapted when operated to gradually close said inlet, thereby regulating the quantity of light admitted into said chamber, and said sleeve carrying a visual figure arranged opposite said eye-opening.

11. A photographic exposure-meter involving a casing forming a chamber, open at one end and having its other end provided with an extension having an eye-opening, a sleeve projecting in said chamber and having a closed outer end, thereby closing the open end of said casing, said sleeve having an irregular-shaped inner end, said inner end of said sleeve adapted when operated to gradually close said inlet, thereby regulating the quantity of light admitted into said chamber, said sleeve carrying a visual figure arranged opposite said eye-opening, and a time-register for indexing the time the camera should be exposed, said time-register arranged in operative relation with respect to said inlet.

12. As a new article of manufacture, a photographic exposure-meter involving an element having a graduated light-inlet, and an element having an irregular-shaped end and arranged in operative relation with respect to said first element, one of said elements rotatable within the other of said elements, causing thereby the gradual opening or closing of said inlet, thereby regulating the quantity of light admitted through said inlet.

13. As a new article of manufacture, a photographic exposure-meter involving a closed chamber having an eye-opening and a graduated light-inlet, and a rotatable means for regulating the quantity of light admitted through said inlet and provided with a visual figure adapted to be seen through said eye-opening.

14. As a new article of manufacture, a photographic exposure-meter involving an element having a graduated light-inlet, and an element having an irregular-shaped end for gradually closing said inlet, thereby regulating the quantity of light admitted, one of said elements surrounding the other of said elements, and one of said elements being rotatable.

15. As a new article of manufacture, a photographic exposure-meter involving an element having a graduated light-inlet, an element having an irregular-shaped end for gradually closing said inlet, thereby regulating the quantity of light admitted, one of said elements surrounding the other of said elements, and one of said elements being rotatable, said element provided with the inlet having an eye-opening and said element having the irregular-shaped inner end provided with a figure visible through said eye-opening of the other element.

In testimony whereof I have hereunto set my hand in presence of two subscribing witnesses.

CHARLES W. DAKE.

Witnesses:
EDWARD TAGGART,
MARY S. TOOKER.